United States Patent
Kraft et al.

(10) Patent No.: US 11,951,981 B2
(45) Date of Patent: Apr. 9, 2024

(54) SYSTEMS AND METHODS FOR DETECTING TURN INDICATOR LIGHT SIGNALS

(71) Applicant: GM GLOBAL TECHNOLOGY OPERATIONS LLC, Detroit, MI (US)

(72) Inventors: Daniel R Kraft, Berkley, MI (US); Taylor A. Jakubczak, Howell, MI (US); Amanpal S Grewal, Novi, MI (US); Darren Khan, Rochester Hills, MI (US); Ben Llewellyn, Ypsilanti, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 291 days.

(21) Appl. No.: 17/652,965

(22) Filed: Mar. 1, 2022

(65) Prior Publication Data
US 2023/0278553 A1    Sep. 7, 2023

(51) Int. Cl.
*B60W 30/095*   (2012.01)
*B60W 10/04*   (2006.01)
(Continued)

(52) U.S. Cl.
CPC ........ *B60W 30/0956* (2013.01); *B60W 10/04* (2013.01); *B60W 10/18* (2013.01);
(Continued)

(58) Field of Classification Search
CPC ................ G06V 20/584; B60W 50/14; B60W 2050/143; B60W 2050/146; B60W 2710/18; B60W 2710/20
(Continued)

(56) References Cited

U.S. PATENT DOCUMENTS 8,941,482 B1 *  1/2015  Gouverneur ............. B60Q 1/40
                                                     340/539.1
2017/0080853 A1 *  3/2017  Raghu ...................... B60Q 1/40
(Continued)

FOREIGN PATENT DOCUMENTS

EP          2579231 A1 *  4/2013   ......... G06K 9/00798
WO   WO-2021226062 A1 * 11/2021   ........... G08G 1/0967

OTHER PUBLICATIONS

Mauricio et al., "A Robust Algorithm for the Detection of Vehicle Turn Signals and Brake Lights," 2012, Publisher: IEEE.*

*Primary Examiner* — Tuan C To
(74) *Attorney, Agent, or Firm* — Lorenz & Kopf LLP

(57) ABSTRACT

Systems and methods of detecting and validating a turn light indicator in a vehicle include receiving optical perception data from an optical perception system. The optical perception data includes data describing a detected turn indicator light of another vehicle perceived by the optical perception system including a status of the detected turn indicator light. A turn indicator light signal is generated in the form of a time varying waveform based on the status of the detected turn indicator light. A duty cycle and frequency of the turn indicator light signal is obtained. An assessment is made whether the detected turn indicator light is a valid detection by comparing the duty cycle and frequency with predetermined bounds. When the detected turn indicator light is assessed to be a valid detection, then an automated feature of the vehicle is controlled based on the data describing the detected turn indicator light.

20 Claims, 4 Drawing Sheets

(51) Int. Cl.
  *B60W 10/18*    (2012.01)
  *B60W 10/20*    (2006.01)
  *B60W 50/14*    (2020.01)
  *G06V 20/58*    (2022.01)

(52) U.S. Cl.
  CPC ............ *B60W 10/20* (2013.01); *B60W 50/14* (2013.01); *G06V 20/584* (2022.01); *B60W 2050/143* (2013.01); *B60W 2050/146* (2013.01); *B60W 2554/4045* (2020.02); *B60W 2710/18* (2013.01); *B60W 2710/20* (2013.01)

(58) Field of Classification Search
  USPC .......................................................... 701/471
  See application file for complete search history.

(56) References Cited

U.S. PATENT DOCUMENTS

| | | | |
|---|---|---|---|
| 2017/0131719 A1* | 5/2017 | Micks .................... | G08G 1/166 |
| 2019/0354786 A1* | 11/2019 | Lee ........................ | G06N 3/084 |
| 2019/0384994 A1* | 12/2019 | Frossard ................ | G06N 3/044 |
| 2023/0211726 A1* | 7/2023 | Nehushtan ........... | G08G 1/0112 |
| | | | 701/117 |

* cited by examiner

SYSTEMS AND METHODS FOR DETECTING TURN INDICATOR LIGHT SIGNALS

The present disclosure generally relates to vehicles, systems and methods for detecting turn indicator light signals.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control and parking assistance systems correspond to lower automation levels, while true "driverless" vehicles correspond to higher automation levels.

Human drivers may communicate their intent to make a driving maneuver using blinking turn indicator lights to give advance warning. Exemplary situations in which a turn indicator light is activated by a driver includes a parked vehicle that is readying to pull out, a vehicle intending to change lanes and a vehicle turning into a side road. Automated driving systems may benefit from detecting and interpreting turn indicator lights in order to control vehicle motion in response to the indicated driver intention. An optical perception system may falsely detect a turn indicator light for a variety of reasons such as shimmering of sunlight, environmental factors, or external artificial lights and variable shadowing over a target vehicle.

Accordingly, it is desirable to provide systems and methods that support optical perception systems in reducing instances of false turn light signal detections. Furthermore, other desirable features and characteristics of the present invention will become apparent from the subsequent detailed description and the appended claims, taken in conjunction with the accompanying drawings and the foregoing technical field and background.

SUMMARY

In one aspect, a method of detecting a validating and turn light indicator in a vehicle is provided. The method includes receiving, via a processor, optical perception data from an optical perception system of the vehicle, wherein the optical perception data includes data describing detected turn indicator light of another vehicle perceived by the optical perception system including a status of the detected turn indicator light. The method includes generating, via the processor, a turn indicator light signal in the form of a time varying waveform based on the status of the detected turn indicator light. The method includes obtaining, via the processor, a duty cycle and frequency of the turn indicator light signal. The method includes assessing, via the processor, whether the detected turn indicator light is a valid detection by comparing the duty cycle and frequency with predetermined bounds. When the detected turn indicator light is assessed to be a valid detection, then controlling, via the processor, automated feature of the vehicle based on the data describing the detected turn indicator light.

In another aspect, a vehicle is provided. The vehicle includes an optical perception system and a processor in operable communication with the optical perception system. The processor is configured to execute program instructions. The program instructions are configured to cause the processor to carry out the following: receive optical perception data from the optical perception system of the vehicle, wherein the optical perception data includes data describing detected turn indicator light of another vehicle perceived by the optical perception system including a status of the detected turn indicator light; generate a turn indicator light signal in the form of a time varying waveform based on the status of the detected turn indicator light; obtain a duty cycle and frequency of the turn indicator light signal; assess whether the detected turn indicator light is a valid detection by comparing the duty cycle and frequency with predetermined bounds; and when the detected turn indicator light is assessed to be a valid detection, then control automated feature of the vehicle based on the data describing the detected turn indicator light.

In embodiments, when the detected turn indicator light is assessed not to be a valid detection, then the automated feature of the vehicle is controlled without using the data describing detected turn indicator light.

In embodiments, the assessing further includes deriving a consistency over time metric for of the duty cycle and the frequency and comparing the consistency over time metric with an expected limit.

In embodiments, the predetermined bounds range from 1 to 2 Hertz for the frequency and 30% to 75% ON time for the duty cycle, although other ranges of bounds are contemplated.

In embodiments, the optical perception system includes an artificial intelligence engine configured to detect the turn indicator light based on image data from one or more cameras of the vehicle.

In embodiments, the automated feature of the vehicle includes braking, steering, propulsion, alert outputs and warning outputs.

In embodiments, the time varying waveform is a step function.

In embodiments, the duty cycle is measured over a first time window and the frequency is measured over a second time window.

In embodiments, a length of time of the first time window is the same as a length of time of the second time window.

In embodiments, the data describing detected turn indicator light of another vehicle includes location.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
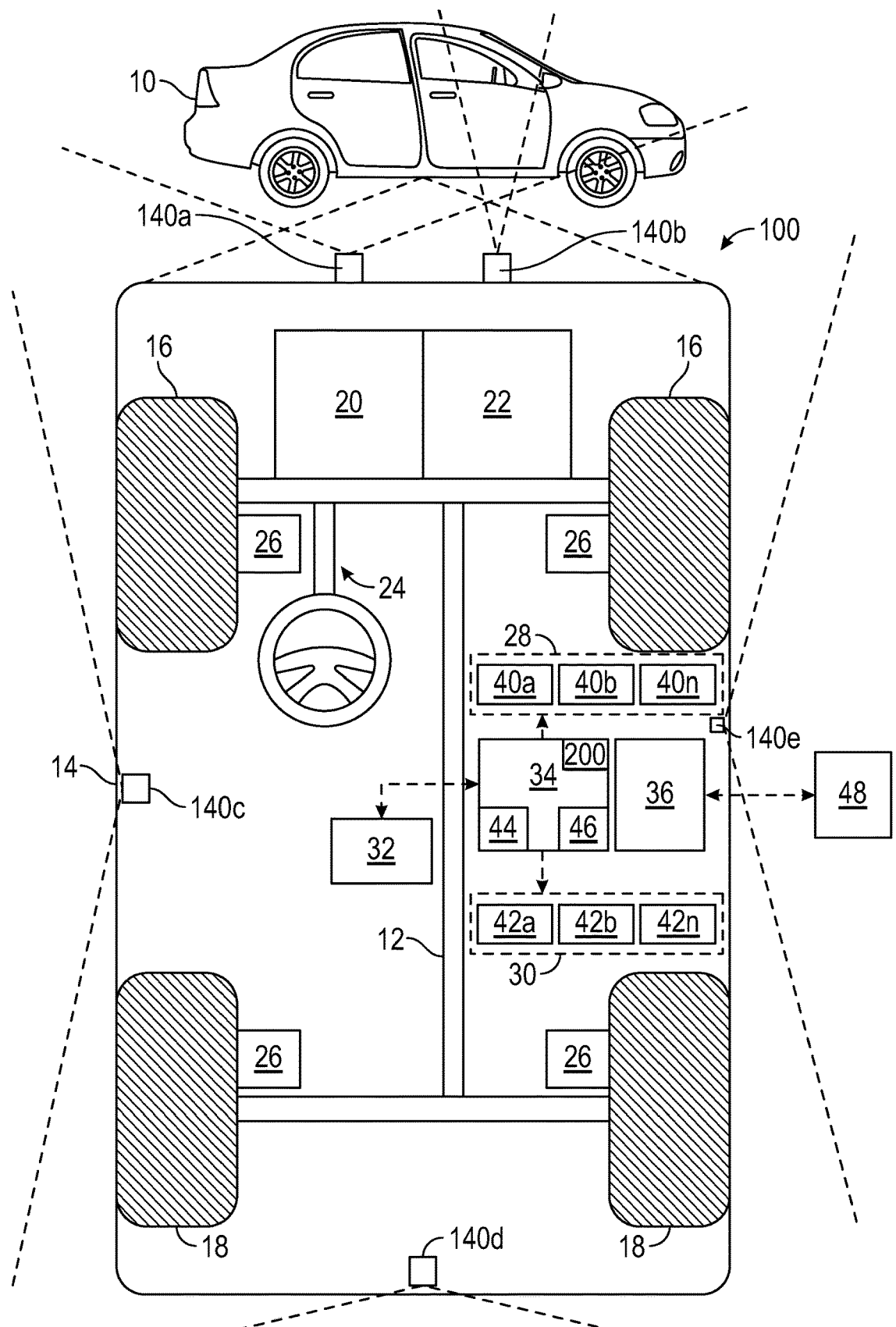
FIG. 1 is a functional block diagram illustrating an autonomous or semi-autonomous vehicle system utilizing a validation system for a detected turn light indicator, in accordance with various embodiments.

With reference to FIG. 1, a vehicle system shown generally at 100 is associated with a vehicle 10 in accordance with various embodiments. In general, the vehicle system 100 includes a validation system 200 that receives a turn light detection signal output from an optical perception system. The turn light detection signal represents a detected turn indicator light state. The validation system characterizes the turn light detection signal in terms of frequency and duty cycle and applies filter criteria that checks whether the frequency and duty cycle falls within expected bounds. If the check determines that the frequency and duty cycle falls within the bounds, then the turn light detection signal is deemed valid. If not, the turn light detection signal is deemed false.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the validation system 200 is incorporated into the autonomous vehicle 10 (hereinafter referred to as the autonomous vehicle 10). The present description concentrates on an exemplary application in autonomous vehicle applications. It should be understood, however, that the validation system 200 described herein is envisaged to be used in semi-autonomous automotive vehicles. In particular, the validation system 200 has utility in association with driver assistance systems such as adaptive cruise control, lane keeping assistance and collision avoidance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there are two front cameras 140*a*, 140*b* arranged for respectively imaging a wide angle, near field of view and a narrow angle, far field of view. There may be one camera or multiple cameras. Further illustrated are left-side and right-side cameras 140*c*, 140*e* and a rear camera 140*d*. The number and position of the various cameras 140*a*-140*n* is merely exemplary and other arrangements are contemplated. For example, only one camera may be provided such as front facing camera or a dashboard camera. The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the validation system 200 and, when executed by the processor 44, are configured to implement the methods and systems described herein for automatically validating optical perception of turn indicator lights by verifying that the frequency and duty cycle of the signal are within expected value ranges.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10. To this end, an autonomous vehicle and autonomous vehicle based remote transportation system can be modified, enhanced, or otherwise supplemented to provide the additional features described in more detail below. The subject matter described herein concerning the validation system 200 is not just applicable to autonomous driving applications, but also other driving systems having one or more automated features utilizing automatic turn indicator light detection.

Figure 2:
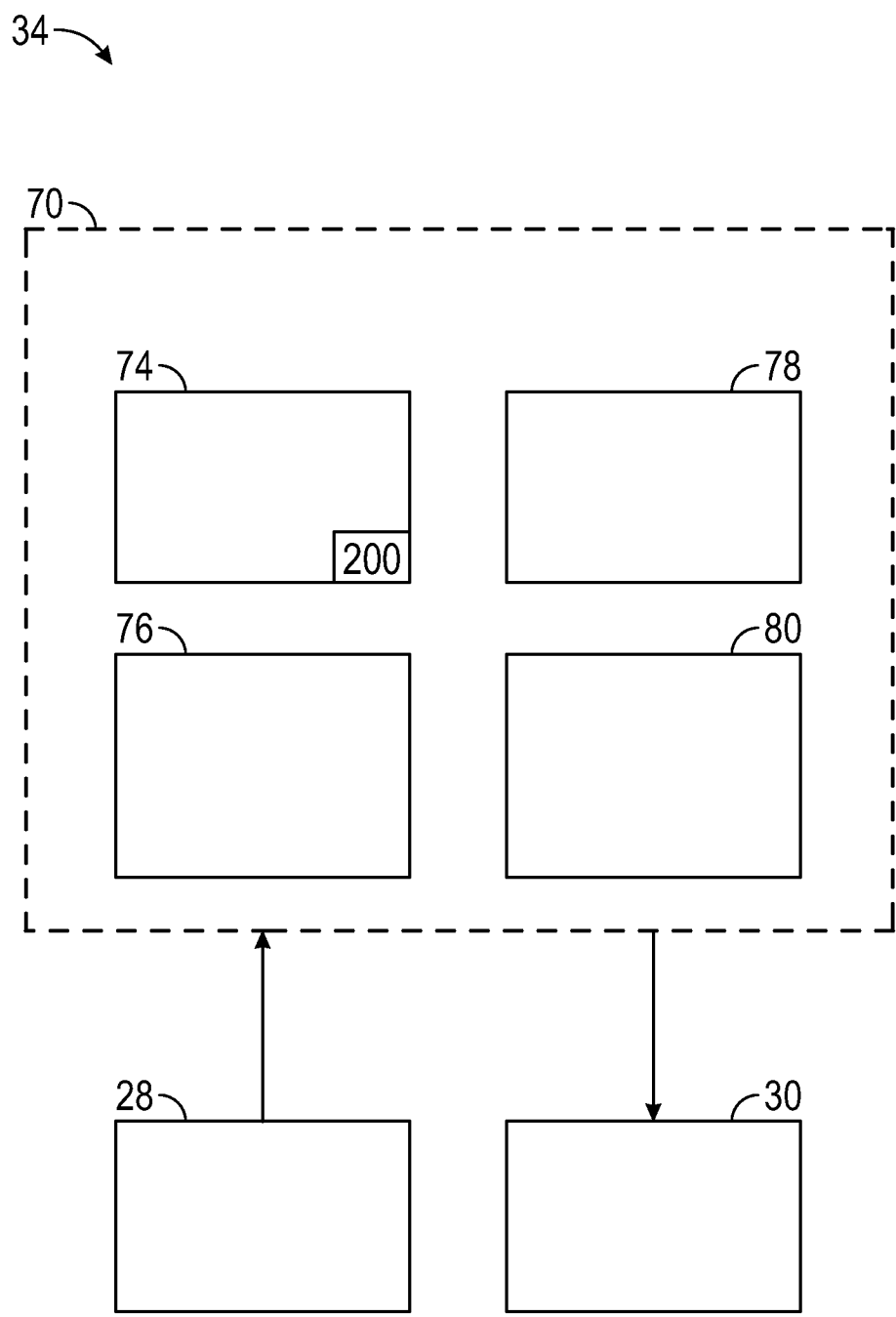
FIG. 2 is a dataflow diagram illustrating an autonomous driving system that includes a validation system for a detected turn light indicator, in accordance with various embodiments.

In accordance with an exemplary autonomous driving application, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

Figure 3:
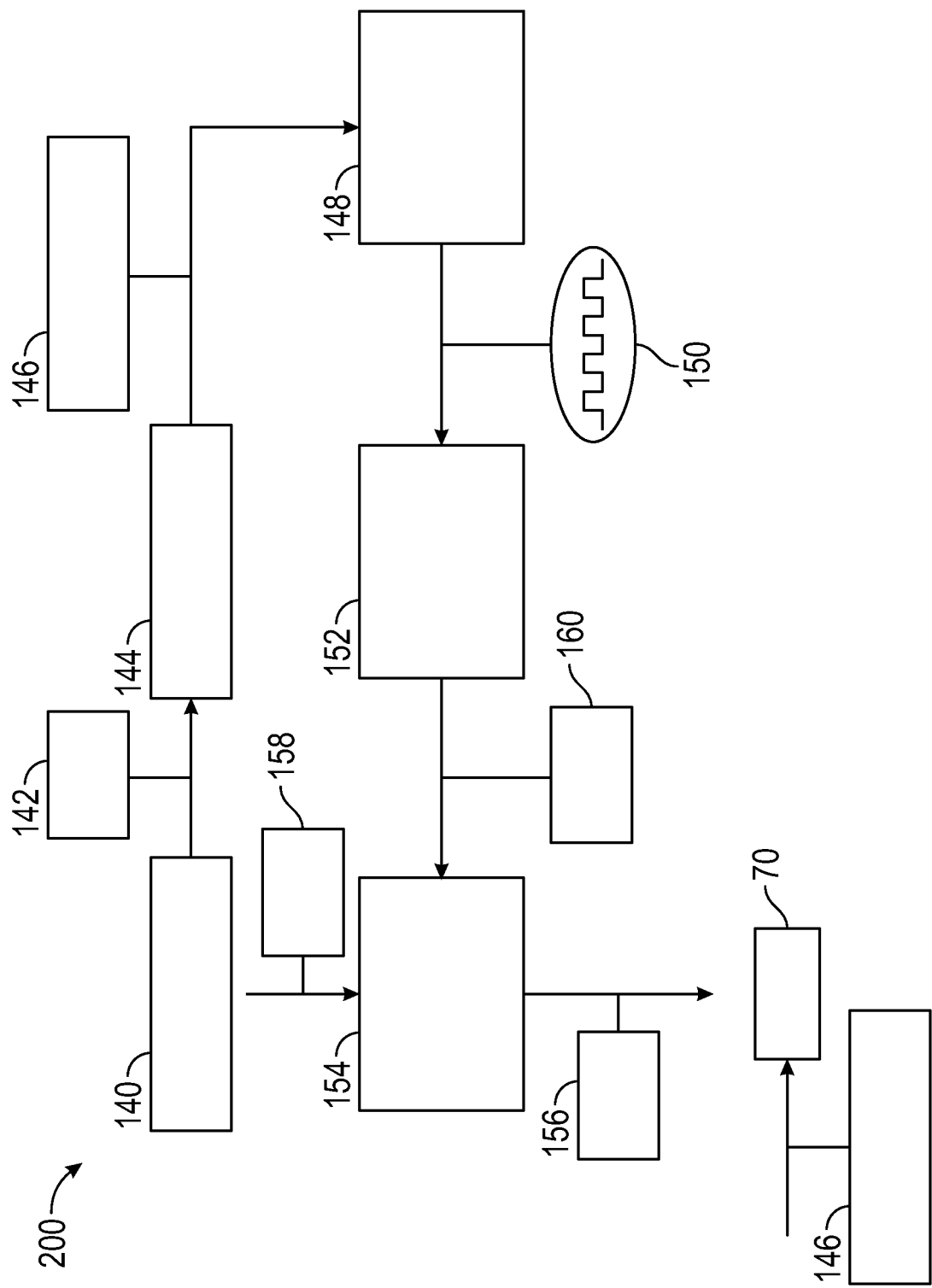
FIG. 3 is a system diagram illustrating functional blocks for validating a detected turn light indicator, in accordance with various embodiments.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 includes an optical perception system 144 that provides optical perception data 146 (see FIG. 3) that includes data relating to turn indicator lights such as light type (e.g. brake, turn indicator, hazard) and other light descriptors (color), semantic meaning (e.g. on/off state), left or right location on target vehicle and bounding box location.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. The positioning system 76 may process a variety of types of raw localization data in determining a location of the vehicle 10 including Inertial Measurement Unit data, Global Positioning System (GPS) data, Real-Time Kinematic (RTK) correction data, cellular and other wireless data (e.g. 4G, 5G, V2X, etc.), etc.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the validation system 200 of FIG. 1 (and FIG. 3) is included within the ADS 70 in autonomous driving applications, for example in operable communication with the computer vision system 74, the positioning system 76, the guidance system 78 and the vehicle control system 80. The validation system 200 receives data from the computer vision system 74 describing turn indicator lights, which is converted into a pulse form turn indicator signal and characterized in terms of pulse width and duty cycle. The validation system 200 validates a turn indicator light signal by checking whether the frequency and duty cycle falls within respective predetermined bounds.

Referring to FIG. 3, with continued reference to FIGS. 1 and 2, the validation system 200 is further illustrated in accordance with exemplary embodiments. The validation system 200 includes functional modules that are performed by the programming instructions described hereinbefore and other system components. The validation system 200 includes one or more cameras 140, an optical perception system 144, a turn indicator light signal generation module 148, a signal feature characterization module 152 and a pass/fail decision module 154.

The one or more camera(s) 140 are imaging devices that provide imaging data 142 representing a digital version of an environment around the vehicle 10. The imaging data 142 is provided in the form of a sequence of frames at a frame rate of the one or more camera(s). As described with respect to FIG. 1, the one or more camera(s) may be forward, rearward and/or side seeing. The image data 142 incudes images of other traffic vehicles (or target vehicles). For example, when the vehicle 10 is travelling along a road, the image data 142 may image another vehicle in the viewable external environment of the vehicle 10. The image data 142 of other target vehicles may include light devices of the other target vehicles such as brake lights, headlights, turn indicator lights, hazard lights, etc. Turn indicator lights are those that blink (or go on and off repeatedly) to indicate an intention of the other vehicle to move in the indicated direction (e.g. left for the left indicator light and right for the right indicator light). The indicator lights may be activated by a human operative of the other vehicle or may by an automated system of the other vehicle.

The image data 142 from the one or more camera(s) 140 is provided to an optical perception system 144, which may be included as part of the computer vision system 74 (FIG. 2). The optical perception system 144 may be embodied in a variety of ways to identify and describe, among other optical targets of interest, turn indicator lights of other vehicles. For example, a neural network, such as a convolutional neural network, can be trained to identify the state of the vehicle signal lights. In one example, a target vehicle identified in a depth map (e.g. using a lidar depth sensor) of the environment can be used to identify a subsection within the image data 142 corresponding to a focused area of the target vehicle including turn indicator lights. The convolutional neural network (cNN) can be trained to perform the identification of the turn indicator lights state (and other descriptors) by processing the focused area of the image data. In one example, the cNN can be trained to recognize colors appearing within the focused areas as well as other factors such as position of the objects (e.g., "blobs") of color within the focused areas. Some pre-processing can be performed on the image data 142 to enhance contrast of the turn indicator lights (and other signal lights like brake lights) before processing by the neural network. Accordingly, the optical perception system 144 includes artificial intelligence for detecting and extracting features describing turn indicator lights of target vehicles in an environment around the vehicle 10. The artificial intelligence can be implemented with techniques, such as machine learning, deep learning, a neural network, a convolutional neural network (e.g., a ConvNet), a recurrent neural network, random forests, genetic algorithms, and reinforcement learning. The optical perception system 144 can output optical perception data 146 including features describing any detected turn signal indicator lights including such features as location (e.g., pixel location), size, shape, average intensity (e.g., in lumens), and/or color (e.g., white, yellow, red), left blinker (turn indicator light) ON, left blinker OFF, right blinker ON, and right blinker OFF. The optical perception data 146 is time varying in that it changes as new frames of image data 142 are provided by the one or more camera(s).

The turn indicator light signal generation module 148 isolates and extracts data concerning turn indicator lights according to a classification provided in the perception data 146. The turn indicator light signal generation module 148 generates a turn indicator signal 150 that is a time varying signal representing a state of each individual turn indicator light included in the optical perception data 146. In the exemplary embodiment of FIG. 3, the turn indicator light signal 150 is provided as a pulse wave form that is high when the turn indicator light state is ON and that is low when the turn indicator light state is OFF (or vice versa).

The signal feature characterization module 152 is configured to analyze the turn indicator light signal 150 and characterize the duty cycle and the frequency of the turn indicator light signal 150. Duty cycle characterizes a percentage of ON time over a first time window of the turn indicator light signal or a percentage of OFF time. Frequency can be measured by counting an average number of ON cycles of the turn indicator light signal 150 over a second time window and dividing by a length of the second time window. The first and second time windows may last the same amount of time or different and are adjustable (calibratable) values. The duty cycle and the frequency of the turn indicator light signal is output as signal features 160 by the signal feature characterization module 152.

The pass/fail decision module 154 applies filter criteria to sort whether the signal features 160 are considered likely to represent a turn indicator light or not. Turn indicator lights will, generally, have a frequency and duty cycle falling within predetermined bounds. The pass/fail decision module 154 applies frequency bounds and duty cycle bounds to the measured frequency and duty cycle of the turn indicator light signal 150 to determine whether the turn indicator light signal can validly be assumed to be a turn indicator light (a pass condition) or whether the turn indicator light data in the optical perception data 146 for any detected turn indicator light represents a false detection (a fail condition). The pass/fail decision module 154 may output a pass or fail condition as output data 156 in addition to an identifier of the turn indicator light to which the pass or fail condition applies. In some embodiments, the bounds for the duty cycle and the frequency are provided to the pass/fail decision module as bounds data 158 retrieved from computer readable storage device 46. The bounds for the duty cycle may, for example, require an ON time of between 30% to 75%. The bounds for the frequency may, for example, require 60 to 120 flashes (ON cycles) per minute (or 1 to 2 Hertz).

In embodiments, the pass/fail decision module may apply an additional filter criteria, namely a consistency of the frequency and/or the duty cycle. A consistency metric (such as a standard deviation) in a time varying frequency and/or duty cycle may be derived over a third time window and a certain minimum consistency must be achieved for the pass/fail decision module 154 to confirm the turn indicator light signal as validly corresponding to a turn indicator light.

The output data 156 is provided to the ADS 70 in one exemplary embodiment. When the output data 156 indicates that a turn indicator light has been validly detected, the ADS 70 may proceed to rely on the corresponding turn indicator light data in the optical perception data 146 and to control at least one vehicle feature based thereon. For example, one or more of propulsion, steering and braking may be controlled based on the data detected for the turn indicator light of a target vehicle. Additionally, or alternatively, the vehicle may include one or more audible and/or visual output devices that output an audible and/or visual warning or alert in response to the output data Exemplary control actions can include c. hanging a speed of the vehicle 10 upon detecting a proximal merging vehicle. When the output data 156 indicates that a turn indicator light has been falsely detected, the turn indicator light detection is ignored/debounced and the ADS 70 proceeds to control the vehicle 10 as though the turn indicator light had not been detected.

Figure 4:
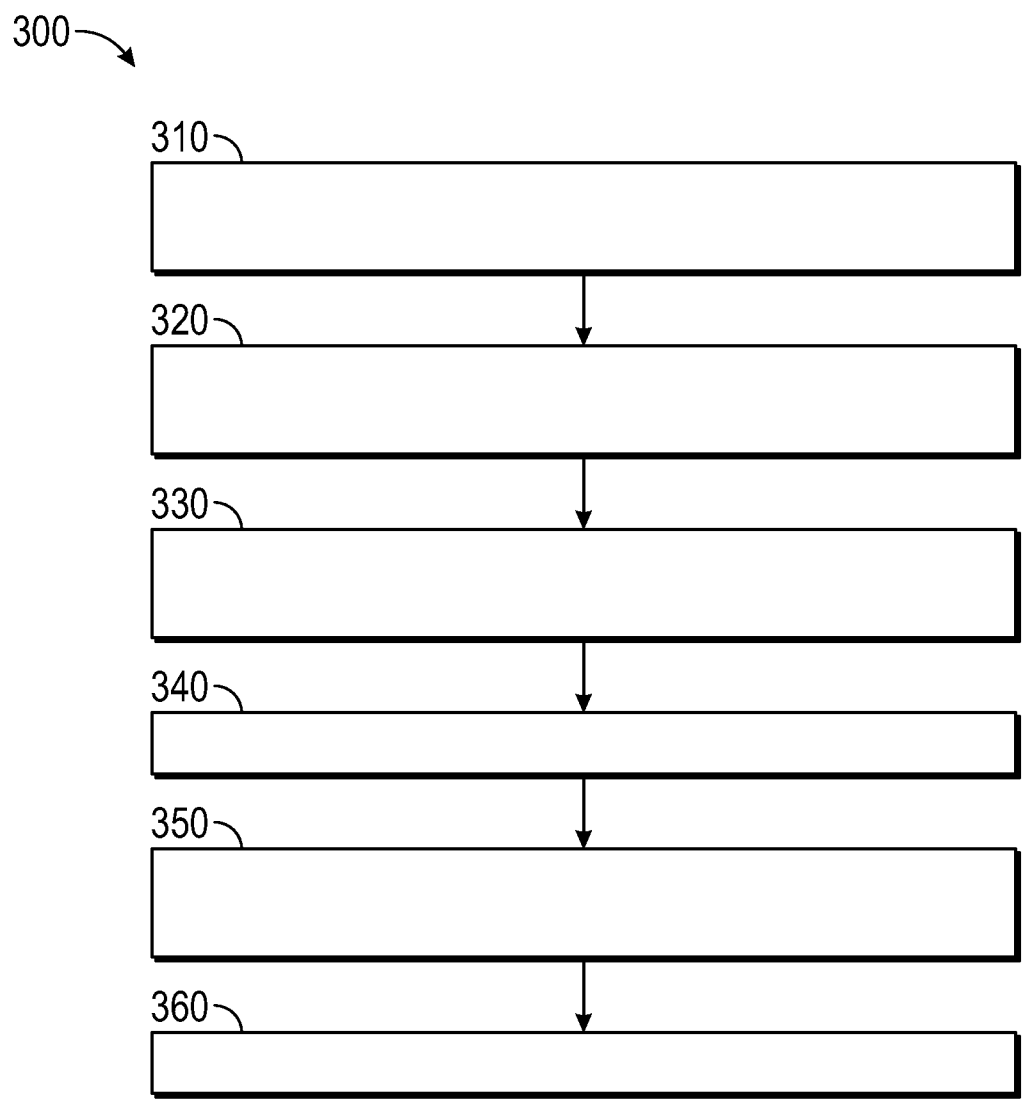
FIG. 4 is a flowchart illustrating method steps of an algorithmic process to detect and validate a turn indicator light, in accordance with various embodiments.

Referring now to FIG. 4, and with continued reference to FIGS. 1-3, a flowchart illustrates a method 300 of validating detection of a turn indicator light in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 300 can be scheduled to run based on one or more predetermined events, and/or can run continuously during operation of the vehicle 10. As discussed previously herein, the method is applicable to autonomous, semi-autonomous and non-autonomous vehicles 300 having turn indicator light detection functionality.

At step 310, optical perception data 146 is received from the optical perception system 144. The optical perception data 146 includes turn indicator light description data for at least one detected turn indicator light of another vehicle in the environment of the vehicle 10. The turn indicator light description data may include a classification of a turn indicator light type, a status (ON/OFF) and a variety of further descriptors such as location, color, brightness, etc. The optical perception system 144 classifies a turn indicator light signal and regresses the status and any further descriptors using an artificial intelligence engine. The artificial intelligence engine can be implemented with techniques, such as machine learning, deep learning, a neural network, a convolutional neural network (e.g., a ConvNet), a recurrent neural network, random forests, genetic algorithms, reinforcement learning and combinations thereof.

At step 320, a turn indicator light signal 150 is generated from the turn indicator light data included in the optical perception data 146. The turn indicator light signal 150 is provided in the form of a time varying pulse wave that oscillates between high and low states depending on a status of the detected turn indicator light. That is, a high state is output when the turn indicator light is detected to have an ON status and a low state is output when the turn indicator light is detected have an OFF status (or vice versa). The time varying pulse wave may be a step function.

At step 330, a duty cycle and frequency of the turn indicator light signal 150 is determined. The duty cycle and frequency of the turn indicator light signal may be determined over respective time windows, which may or may not be the same length of time. The time windows may correspond to at least a few cycles of an average turn indicator light, e.g. at least 2 seconds.

At step 340, the method 300 checks whether the duty cycle and the frequency fall within valid bounds. Valid bounds for the frequency of the turn indicator light may be from 1 to 2 Hertz. Valid bounds for the duty cycle may be from 30% ON to 75% ON. These ranges may be adjusted depending on regulatory and manufacturer preferences. A further check may be performed that the duty cycle and/or the frequency are not sufficiently consistent over time (e.g. a time window of at least 3 seconds) by checking that a consistency metric (e.g. standard deviation) falls within predetermined bounds.

At step 350, if the check of step 340 reveals that the duty cycle and frequency are within valid bounds (and optionally if the duty cycle and frequency are sufficiently consistent over time), then the method 300 proceeds to use the turn indicator light data in the optical perception data 146 in controlling at least one automated vehicle feature. The automated vehicle feature may be included in the ADS 70 or may be an advanced driving assistance feature. At step 360, if the check of step 340 reveals that the duty cycle and frequency are not within valid bounds (and optionally if the duty cycle and frequency are sufficiently consistent over time), then the turn indicator light data in the optical perception data 146 is not used in controlling the at least one automated vehicle feature.

Disclosed herein are methods and systems that use signal frequency and duty cycle to rationalize turn signal(s) detection in image processing and reporting. A positive detection of turn signal status is required to pass checks to ensure it is consistently within the expected bounds (per known manufacturer and regulatory requirements) for turn signal frequency and duty cycle. The systems and methods utilize an algorithm that will reduce false positive detection of turn signal(s) in semi-autonomous and autonomous driver features. The algorithm monitors signal frequency and duty cycle to ensure it falls within predetermined bounds. The reliability of turn signal status can result in better active safety and autonomous driving system performance. If there is a flashing or change in contrast on a detected vehicle, false positive detection is possible without the validation systems and methods described herein where the flashing or change in contrast are not from the turn signals (such as light reflecting off the vehicle). By integrating the algorithm described herein, a positive detection of turn signal status goes through signal characterizations and filter criteria to ensure it is consistently within expected bounds for turn signal frequency and duty cycle before the signal is output.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting and validating a turn light indicator in a vehicle, the method comprising:
   receiving, via at least one processor, optical perception data from an optical perception system of the vehicle, wherein the optical perception data includes data describing at least one detected turn indicator light of another vehicle perceived by the optical perception system including a status of the at least one detected turn indicator light;
   generating, via the at least one processor, a turn indicator light signal in the form of a time varying waveform based on the status of the at least one detected turn indicator light;
   obtaining, via the at least one processor, a duty cycle and frequency of the turn indicator light signal;
   assessing, via the at least one processor, whether the at least one detected turn indicator light is a valid detection by comparing the duty cycle and frequency with predetermined bounds; and
   when the at least one detected turn indicator light is assessed to be a valid detection, then controlling, via the at least one processor, at least one automated feature of the vehicle based on the data describing the at least one detected turn indicator light.

2. The method of claim 1, wherein when the at least one detected turn indicator light is assessed not to be a valid detection, then the at least one automated feature of the vehicle is controlled without using the data describing at least one detected turn indicator light.

3. The method of claim 1, wherein the assessing further includes deriving a consistency over time metric for at least one of the duty cycle and the frequency and comparing the consistency over time metric with an expected limit.

4. The method of claim 1, wherein the predetermined bounds range from 1 to 2 Hertz for the frequency and 30% to 75% ON time for the duty cycle.

5. The method of claim 1, wherein the optical perception system includes an artificial intelligence engine configured to detect the at least one detected turn indicator light based on image data from one or more cameras of the vehicle.

6. The method of claim 1, wherein the at least one automated feature of the vehicle includes braking, steering, propulsion and outputting a visual and/or audible warning or alert through a visual and/or audio output device.

7. The method of claim 1, wherein the time varying waveform comprises a step function.

8. The method of claim 1, wherein the duty cycle is measured over a first time window and the frequency is measured over a second time window.

9. The method of claim 8, wherein a length of time of the first time window is the same as a length of time of the second time window.

10. The method of claim 1, wherein the data describing at least one detected turn indicator light of another vehicle includes location.

11. A vehicle, comprising:
   an optical perception system; and
   at least one processor in operable communication with the optical perception system, wherein the at least one processor is configured to execute program instructions, wherein the program instructions are configured to cause the at least one processor to:
      receive optical perception data from the optical perception system of the vehicle, wherein the optical perception data includes data describing at least one detected turn indicator light of another vehicle perceived by the optical perception system including a status of the at least one detected turn indicator light;
      generate a turn indicator light signal in the form of a time varying waveform based on the status of the at least one detected turn indicator light;
      obtain a duty cycle and frequency of the turn indicator light signal;
      assess whether the at least one detected turn indicator light is a valid detection by comparing the duty cycle and frequency with predetermined bounds; and
      when the at least one detected turn indicator light is assessed to be a valid detection, then control at least one automated feature of the vehicle based on the data describing the at least one detected turn indicator light.

12. The vehicle of claim 11, wherein when the at least one detected turn indicator light is assessed not to be a valid detection, then the at least one automated feature of the vehicle is controlled without using the data describing at least one detected turn indicator light.

13. The vehicle of claim 11, wherein the program instructions are configured to cause the at least one processor to assess whether the at least one detected turn indicator light is a valid detection further by deriving a consistency over time metric for at least one of the duty cycle and the frequency and comparing the consistency over time metric with an expected limit.

14. The vehicle of claim 11, wherein the predetermined bounds range from 1 to 2 Hertz for the frequency and 30% to 75% ON time for the duty cycle.

15. The vehicle of claim 11, wherein the vehicle includes one or more cameras and the optical perception system includes an artificial intelligence engine configured to detect the at least one detected turn indicator light based on image data from the one or more cameras.

16. The vehicle of claim 11, wherein the at least one automated feature of the vehicle includes braking, steering, propulsion and outputting a visual and/or audible warning or alert through a visual and/or audio output device.

17. The vehicle of claim 11, wherein the time varying waveform comprises a step function.

18. The vehicle of claim 11, wherein the duty cycle is measured over a first time window and the frequency is measured over a second time window.

19. The vehicle of claim 18, wherein a length of time of the first time window is the same as a length of time of the second time window.

20. The vehicle of claim 11, wherein the data describing at least one detected turn indicator light of another vehicle includes location.

* * * * *